(12) United States Patent
Alfred et al.

(10) Patent No.: US 8,244,543 B2
(45) Date of Patent: *Aug. 14, 2012

(54) SYSTEM AND METHOD FOR PERFORMING SPEECH RECOGNITION TO CONTROL DEVICES ON A NETWORK

(75) Inventors: Joseph A. Alfred, Somerset, NJ (US); Joseph M. Sommer, Rutherford, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,655

(22) Filed: Aug. 27, 2011

(65) Prior Publication Data

US 2011/0313776 A1   Dec. 22, 2011

Related U.S. Application Data

(63) Continuation of application No. 11/929,408, filed on Oct. 30, 2007, now Pat. No. 8,010,369.

(51) Int. Cl.
*G10L 21/00* (2006.01)

(52) U.S. Cl. ...................................................... 704/275

(58) Field of Classification Search .................. 704/275
See application file for complete search history.

(56) References Cited

U.S. PATENT DOCUMENTS

| | | | |
|---|---|---|---|
| 4,158,750 A | 6/1979 | Sakoe et al. | |
| 4,785,408 A | 11/1988 | Britton et al. | |
| 5,086,385 A | 2/1992 | Launey et al. | |
| 5,127,043 A | 6/1992 | Hunt et al. | |
| 5,297,194 A | 3/1994 | Hunt et al. | |
| 5,444,673 A | 8/1995 | Mathurin | |
| 6,377,927 B1 | 4/2002 | Loghmani et al. | |
| 6,584,439 B1 | 6/2003 | Geilhufe et al. | |
| 6,950,725 B2 | 9/2005 | Von Kannewurff et al. | |
| 7,031,444 B2 | 4/2006 | Shen et al. | |
| 7,072,328 B2 | 7/2006 | Shen et al. | |
| 7,072,945 B1 | 7/2006 | Nieminen et al. | |
| 7,117,051 B2 | 10/2006 | Landry et al. | |
| 7,127,261 B2 | 10/2006 | Van Erlach | |
| 7,139,716 B1 | 11/2006 | Gaziz | |
| 7,184,848 B2 | 2/2007 | Krzyzanowski et al. | |
| 7,194,072 B2 | 3/2007 | Gamble | |
| 7,245,611 B2 | 7/2007 | Narasimhan et al. | |
| 7,296,066 B2 | 11/2007 | Lehaff et al. | |
| 7,308,484 B1 | 12/2007 | Dodrill et al. | |
| 7,447,635 B1 | 11/2008 | Konopka et al. | |
| 8,010,369 B2 * | 8/2011 | Alfred et al. ................ 704/275 |

* cited by examiner

*Primary Examiner* — Susan McFadden (57) ABSTRACT

A system, method and computer-readable medium for using speech recognition to control devices connected to a network. The system converts an utterance from a user for controlling a remote device in a network to a device specific control language associated with the remote device, to yield a remote device communication. Next, the system synthesizes a response from the remote device that is based at least in part on the remote device communication, to yield an audible response. The system then communicates the audible response to the user.

20 Claims, 8 Drawing Sheets

SYSTEM AND METHOD FOR PERFORMING SPEECH RECOGNITION TO CONTROL DEVICES ON A NETWORK

PRIORITY INFORMATION

The present application is a continuation of U.S. patent application Ser. No. 11/929,408, filed Oct. 30, 2007, the content of which is included herewith in its entirety.

BACKGROUND OF THE INVENTION

1. Field of the Invention

The present invention relates generally to speech recognition and more specifically to performing speech recognition to control specified devices.

2. Introduction

Currently, device control systems are made in many different platforms. There are some systems that are network based, and some that are dependent on modules directly attached to the device. There are also device control systems that contain centralized control over the appliances from remote locations. However, effective and affordable control over devices that are connected to a network is still not readily available. With the ubiquitous nature of networks in the home and office, there is a need for a control system that can operate on these networks and allow remote control of all systems, from the most basic to very complex. Current systems allow access to the network through specific user interfaces or through a centralized network that the user has very little control over. Such deficiencies make network based control systems harder to use for the average customer, thus decreasing their viability.

Therefore, network based control systems can benefit from the ability to both accept and respond in a natural language format, as well as be versatile enough to use the system to convert any speech to a device specific command. Systems currently allow the user to control devices in predetermined, superficial ways. However, they lack the ability to control access based on user defined characteristics and dynamically interact with the user.

Accordingly what is needed is a system that can either be used with natural language, control specific devices with specific identified conversion tools, or both.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems and methods for controlling devices connected to a network. A method embodiment provides for receiving an utterance from a user for remotely controlling a device in a network; converting the received utterance to text using an automatic speech recognition module; accessing a user profile in the network that governs access to a plurality of devices on the network and identifiers which control a conversion of the text to a device specific control language; identifying based on the text a device to be controlled; converting at least a portion of the text to the device control language; and transmitting the device control language to the identified device, wherein the identified device implements a function based on the transmitted device control language.

The principles of this invention may be utilized to control devices that are connected to a network and to further simplify control of those devices using speech. The principles of this invention may also enable the use of device specific identifiers to control specific devices.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
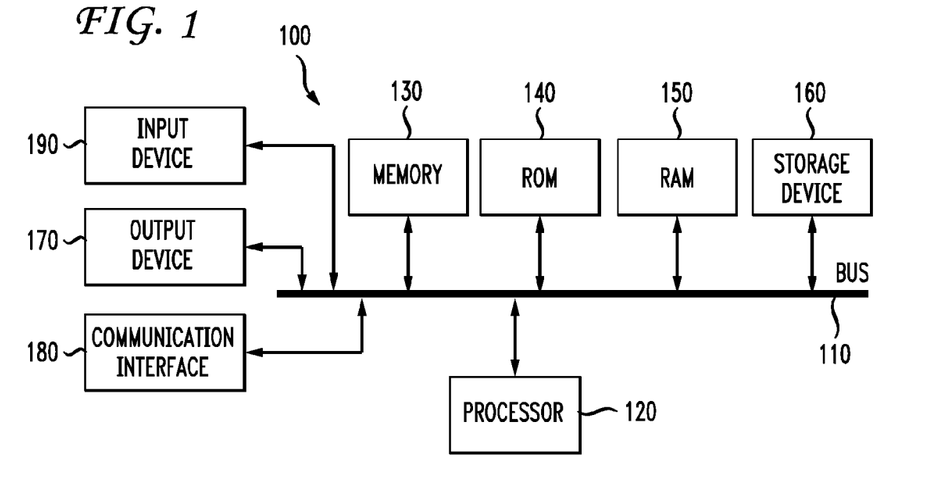
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

FIG. 1 illustrates an exemplary processing system 100 in which one or more of the modules of system 200 may be implemented. Thus, system 200 may include at least one processing system, such as, for example, exemplary processing system 100. Where the inventions disclosed herein relate to the TTS voice, the output device may include a speaker that generates the audible sound representing the computer-synthesized speech.

Communication interface 180 may include any transceiver-like mechanism that enables system 100 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections. In some implementations of system 200, communication interface 180 may not be included in processing system 100 when natural spoken dialog system 200 is implemented completely within a single processing system 100.

As an introductory matter, an aspect of the present invention is directed towards a method for controlling devices which are connected to a network. These devices can be located in any setting that can be connected to a network including but not limited to residential, commercial, and industrial settings.

Figure 2:
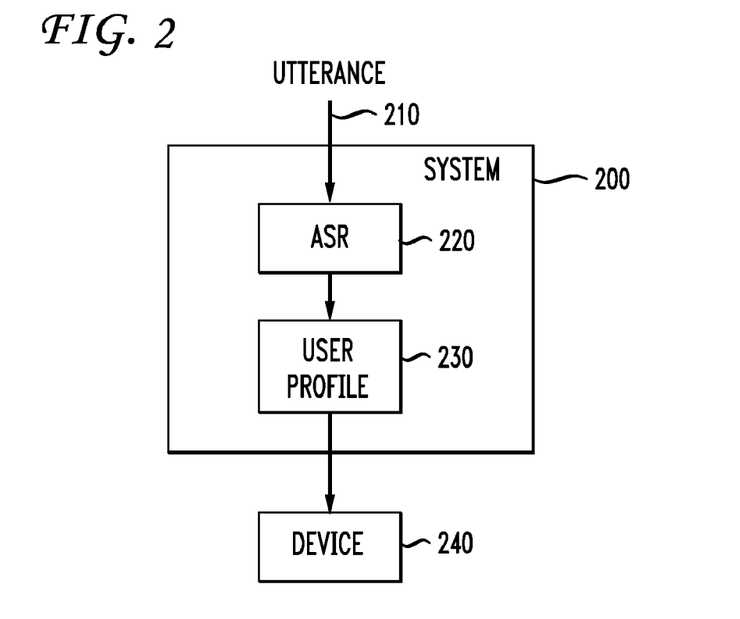
FIG. 2 illustrates an example system with a user profile.

FIG. 2 represents an embodiment of the present invention where a device is controlled by the user calling into the system 200 from a telephone, either land-line, cellular, or VoIP or any other communication system to access a user profile 230 that allows the user to control a device 240. The user's utterance 210 is converted to a text or digital signal by an automatic speech recognition (ASR) module 220. The text or digital signal is any signal that can be recognized by the system 200 and used to implement the commands of the user. Control of the device 240 is governed by the device identifiers that convert the digital signal from the ASR module 220, to a device specific control language that the system 200 uses to control the device 240. Based on the text resulting from the user's call, the system 200 identifies what device 240 is to be controlled. Once the device 240 is identified, the instructions are given to the device 240, and the device 240 executes the command.

The user may employ any method that will carry a voice signal to the system 200. Some non-limiting examples are: two way radio transceivers and other push to talk technology, cell phones, conventional telephones, VoIP or internet applications that will carry voice commands.

The system 200 can utilize any network that can support the hardware and software applications. Since the system 200 needs to be able to support a residential application it is preferable for the system 200 to be operable on a relatively inexpensive network configuration such that it is affordable to the average consumer. An embodiment of the system 200 will contain at least one user profile 230, an ASR module 220 for accepting a user input, and at least one device 240. Further, the network can be interconnected by wires, wireless, or optical platforms in order to facilitate communication between the user and the device.

The system 200 can control any remotely operable device. Examples of such devices are: kitchen appliances, HVAC equipment, security equipment including cameras and alarms, TVs, VCRs, any video or multimedia delivery system, recording devices, computers, computer programs, industrial machines, and maintenance programs. The aforementioned list is exemplary in nature and not comprehensive.

The user profile 230 controls access to the devices 240 associated with the system 200. The user profile 230 may be configured to control communication between the system 200 and the device 240. The user profile 230 can contain device specific identifiers that convert the output of the ASR module 220 into a command that the device 240 can implement. This control of the device specific identifiers will affect the operation of some embodiments of the system 200. For example, if a user utterance 210 is "need to record M.A.S.H. at 5 pm on channel 132", the user profile 230 will receive the text of that utterance from ASR 220 and convert that to a device specific control signal that is transmitted to a device 240 that may be a cable set top box. The control signal will set the recording mechanism to record the desired program at its appropriate time and channel.

Figure 3:
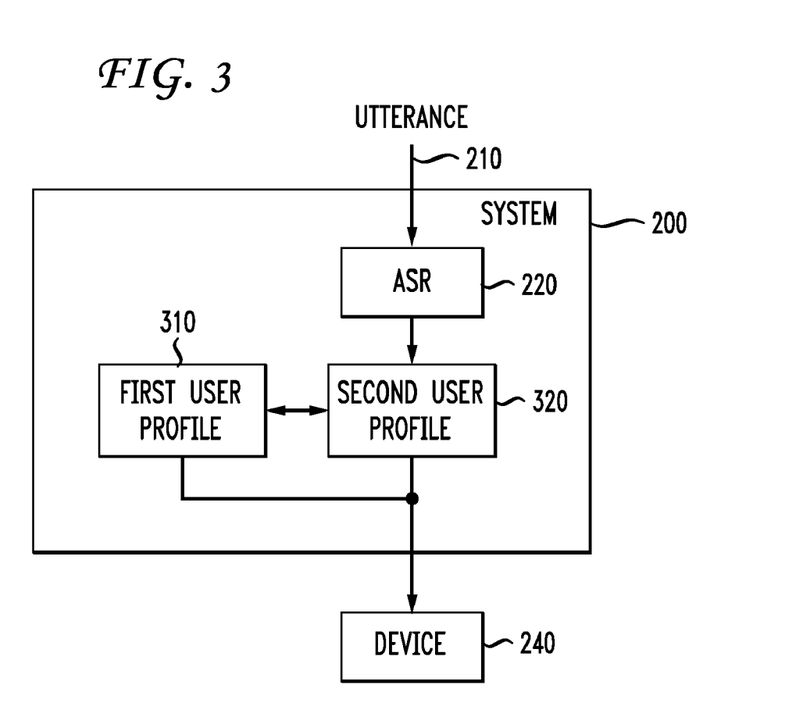
FIG. 3 illustrates an example system having 2 user profiles.

FIG. 3 represents one embodiment of the system where there is more than one user profile. Creation of more than one user profile allows the system 200 to have a hierarchy of profiles where each profile has access to different identifiers. Referring back to FIG. 3, the utterance 210 received by the system 200 is converted to a digital signal using the ASR module 220. This digital signal is transferred to the first user profile 310 or second user profile 320 depending on which user is trying to access the system 200. Since each user profile 310 and 320 contains a different set of device identifiers, access to a device 240 may be limited. One example of using this hierarchy is a parent creating one user profile for themselves and one user profile for their children. Another example is a boss creating one profile for him or herself and then control the access granted to each of the divisions under his or her control. This embodiment has applicability to any situation where access to a specific device needs to be controlled and modification or removal of identifiers can achieve this control. The specific user profiles may also include language models used in the ASR or any other speech-based process of the system that is particular to a user or group (i.e., a division profile for a particular division).

Figure 5:
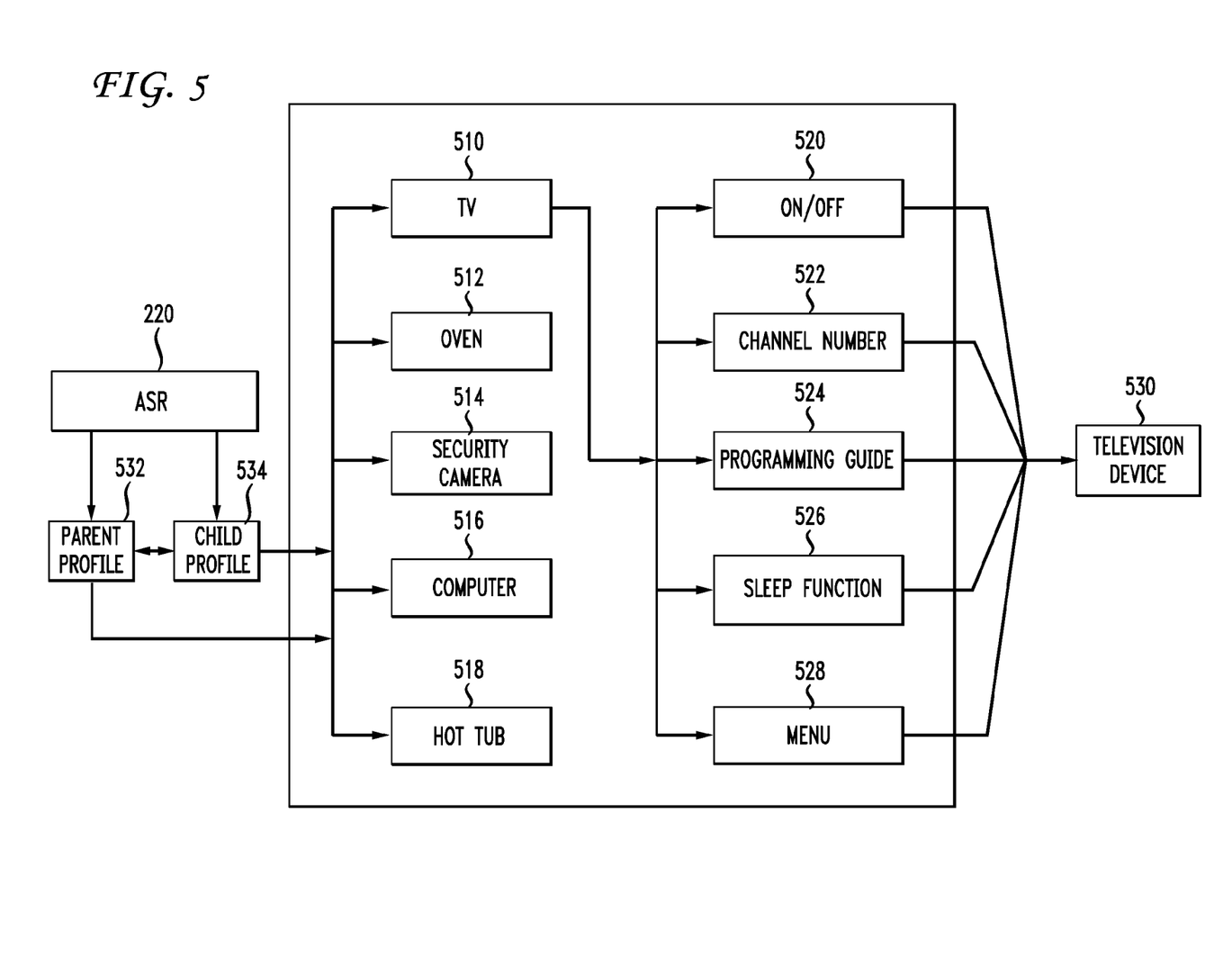
FIG. 5 illustrates an example user profile containing device identifiers.

An example of controlling access to the identifiers follows and is represented in FIG. 5. A parent creates two profiles on the network, one parent profile 532, and one children's profile 534. The child then attempts to access the television 530, but in order to access the television the child needs to use the children's profile 534 created by the parent profile. The children's profile 534 contains identifiers to access and control for each of five devices the parent profile has deemed appropriate for the children's profile 534. In order to control the television device 530 the child must have access to the TV identifier 510. Access to the TV identifier 510 is one way the parent profile controls access to the television device 530.

To control the access to the television device 530 the parents could remove the specific TV identifier 510 from the children's profile 534. Another option for the parent profile, rather than remove the specific TV identifier 510, is to modify the identifier. One modification is to remove the on/off function 520 from the children's profile 534. This removes the ability of the children's profile 534 to turn the television device 530 on or off. Another modification of the specific TV identifier 510 is to combine the removal of the on/off function 520 with the use of the sleep function 526 to control the amount of time a child is watching the television device 530. A parent by simply setting the sleep function 526 of the specific TV identifier 510 for a specified time and then allowing the television device 530 to turn off automatically precludes the child from further use of the television device 530 due to the modification of the specific TV identifier 510. It is also noted that besides controlling devices remotely using natural languages. The present disclosure enables the parent to control, via a remote natural language input, a subservient child profile. Thus, the parent may say, "Access John's profile and remove the television." In this regard, the subservient profile is controlled as would be any other device in the network.

Still another example is to modify the channel number identifier 522 within the specific TV identifier 510 no longer to recognize certain speech patterns that represent inappropriate channels as deemed by the parent profile. For instance, a child could say "change the channel to ESPN" and the modified identifier would recognize this speech pattern as appropriate, if so deemed by the parents, and would change to the appropriate channel. If the same child were to say "change the channel to HBO" the modified identifier will not process this command if the identifier is modified to disallow the speech pattern representing "HBO" by the parent profile. The channel number identifier 522 can also be modified by the parent profile to disallow the channel numbers that represent the aforementioned channel names. Another example could be a boss wanting to be the only person allowed to schedule meetings in a conference room. An employee can call the system 200 and ask it to make an appointment for 3:00 p.m. in the conference room. However, since the boss has restricted the identifier from accessing the scheduling mechanism for the conference room, the system 200 would be unable to complete this request.

Figure 4:
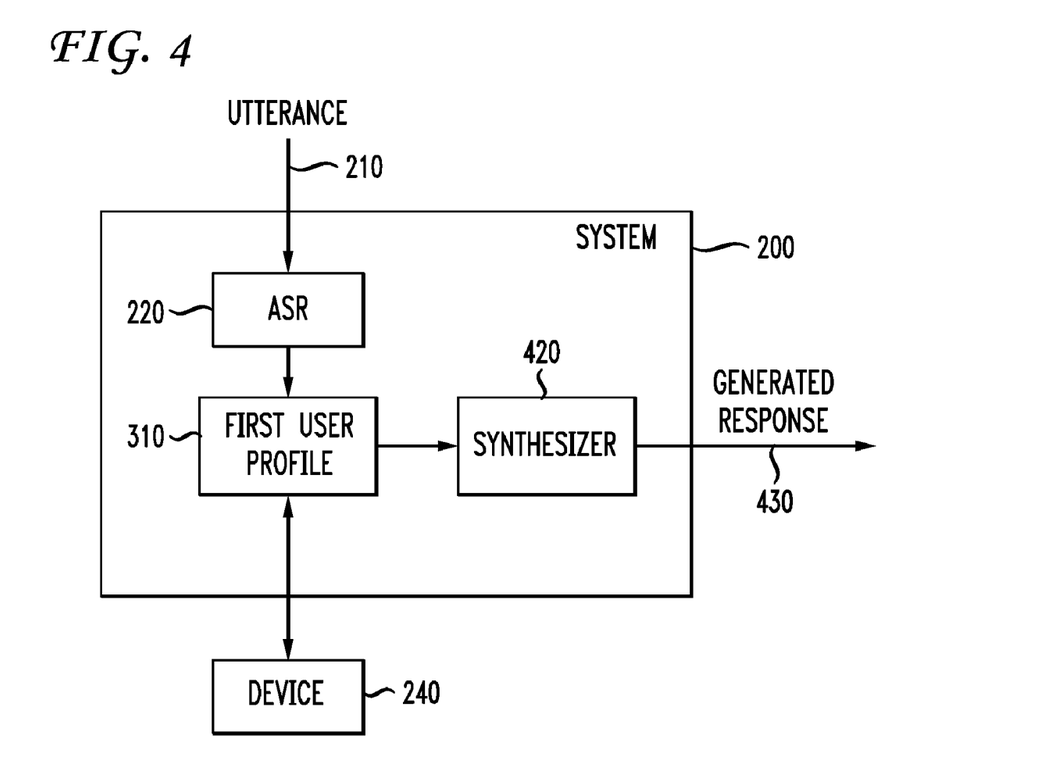
FIG. 4 illustrates an example system having the ability to generate a response.

Further, an aspect of the system 200 allows it to generate a response 430 from the device 240 that is being controlled; this is depicted in FIG. 4. The system operates by having the user give a command 210 to the system 200, which the system 200 turns into a digital signal via the ASR module, 220. The digital signal is then communicated to the first user profile 310 where it is subsequently converted to a device specific control language. This device specific control language is used to control the specified device 240. The device 240 is then able to respond to the command by generating a device response. The device response is converted to a standard digital signal by the system and optionally with reference to the first user profile 310. This standard digital signal is then converted to a generated response 430 by the synthesizer 420. The digital signal from the device 240 may also be communicated directly with the synthesizer if appropriate.

This embodiment of the system is illustrated by the following example. A user calls the system to control a cable enabled device and asks the system if any John Wayne movies are scheduled on a specified evening. The cable enabled device completes the search and transfers a message from the device to the user optionally with reference to the user profile representing the time, if there is one, of when a John Wayne movie is located in a programming guide. This message would then be used to generate a response indicating the results of the cable enabled device's search. The user, after receiving the information generated by the cable enabled device, can either plan on being home at the specified time to watch the movie or to place a command with a recoding device to record the movie that was identified by the cable enabled device.

Further applications of the system 200 can check the status of a device in the home or at a business. For instance, a parent calls the network to ask what program is currently being shown on the television. The appliance then accesses the programming guide, cross references the channel currently being presented, and reports the result to the parent. This enables parents to keep track of their children even when the parents are not at home. It could also be used by bosses in very similar respects. A boss can access the network and ask what webpage is being accessed by an employee. If it is a non-work related webpage, the boss would know the employee is not utilizing his or her time properly. Those of skill in the art will recognize myriad uses, not mentioned here, for the system that still are within the scope of the claims.

Figure 6:
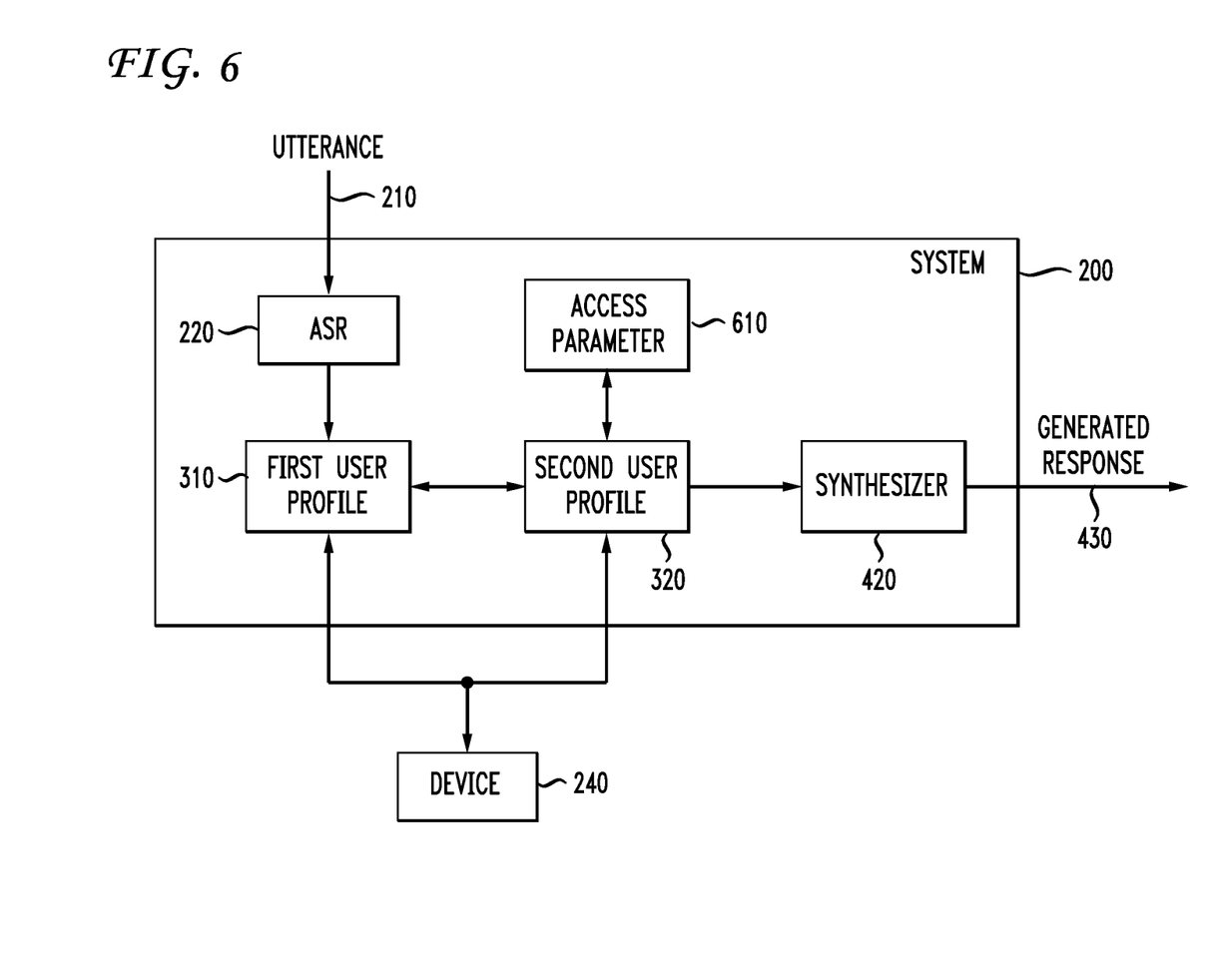
FIG. 6 illustrates an example system having an access parameter.

Another embodiment of the system, as shown in FIG. 6, allows first user profile 310 to control access to the identifiers contained in the second user profile 320 by using an access parameter 610. Access parameter 610 is a set criterion that must be met by the second user profile 320 prior to being granted access to the specified identifiers. The system 200 controls access by checking that the user associated with the second user profile has met the criterion for access. This happens by the system accepting the utterance from the user associated with the second user profile 320 and converting it into a digital signal using the ASR 220. The second user profile 320 then recognizes that there is an access parameter 610 created by the first user profile. The second user profile 320 then generates a query via the synthesizer 420 to elicit information to test if the user has met the criterion of the access parameter 610. The user then responds to the query which is received as an utterance 210 into the system 200 and converted into a digital signal by the ASR 220. The second user profile 320 then checks the response to the query against the criterion of the access parameter 610. If the criterion is met, access is granted, if the criterion is not met, access is denied.

The previous embodiment is exemplified by a parent setting an access parameter 610 that the child must finish his or her homework prior to watching the television device 240. The child would then access the second user profile 320 in order to turn on the television device 240. The second user profile 320 will recognize that an access parameter 610 set by the first user profile 310 must be met prior to allowing the second user profile 320 access to the identifiers. The second user profile 320 then generates a message 430 to the child to confirm that the child's homework has been completed. Upon receiving confirmation of completion, the second user profile 320 allows access to the identifier associated with the television device 240, and responds to the child's command by turning on the television device 240. It is further noted that while the example put forth deals with a single parameter and a single device that the invention is not so limited and can include multiple access parameters to multiple devices.

Figure 7:
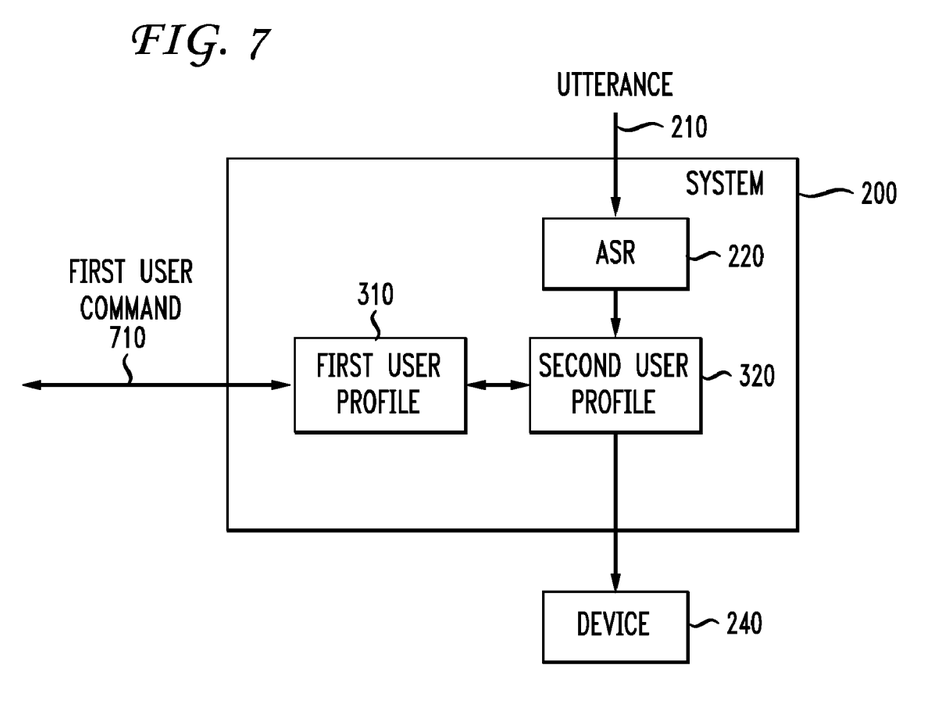
FIG. 7 illustrates an example system being able to receive commands from a user.

The system can also allow the first user to control access to the identifiers of the second user as illustrated in FIG. 7. This embodiment would function in a similar manner as the previous embodiment. The difference being this embodiment allows the first user to grant access to the second user profile 320 in lieu of the query presented in the previous embodiment of the system 200. In the present embodiment the user associated with the second user profile attempts to access the identifiers within the second user profile 320. The second user profile 320 recognizes that in order for the user associated with the second user profile to gain access to the identifiers, access must be granted by the user associated with the first user profile. The second user profile 320 communicates with the first user profile 310 to generate an evaluation request which is communicated to the user associated with the first user profile. The user associated with the first user profile then responds to the evaluation request with a first user command 710 that the first user profile 310 evaluates as an allowance or denial of access to the identifiers. The first user profile 310 then communicates the allowance or denial to the second user profile, which allows or denies access based on that command. In this embodiment, the first user profile 310 directly controls access to the identifiers and grants or denies access via a first user command 710 that allows or denies the second user profile access to the specified device identifier.

An example of the aforementioned embodiment is a parent controlling access to the family computer. When the child attempts to access the family computer, the first user profile recognizes this attempt and will only grant the second user profile access to the computer device identifier if the first user command, communicated through the first user profile, grants the access. To further exemplify the utility and versatility of the system, it would be possible to combine the embodiment shown in FIG. 6 with the embodiment shown in FIG. 7 to create an embodiment that uses both an access parameter and a first user command to judge if the second user profile should be granted access. This combination of embodiments can be useful in many environments including a hospital, where a doctor sets a parameter for a nurse to implement an order. Then prior to the actual implementation of the order the doctor is still able to give the final ok after review and communication with the nurse, record, and patient.

A further aspect of the system involves the modification of the device identifiers to regulate access to the devices. An example modification involves varying time. This is used to control access to the identifiers so they can only be used during certain times of the day or for only a certain amount of time. Further examples include a manager allowing his or her employees to access the vacation schedule for only a two week period at the beginning of every calendar year, after which time the employee must have managerial permission to take days off. In a residential application, a parent may allow a child to use the computer for one hour every night and then have the child denied access after that time. Using time as a variable allows a much more dynamic interaction between the two user profiles in order to cater to individual needs of each user and not be confined to bright line yes or no parameters in the use of the system.

Another embodiment of the system 200 is where the user profile 230 is protected by security features in order to protect the user profile 230 from being misused or misappropriated. Security features are commonly known and can be anything from personal pin numbers for each user profile or a spoken password. A further feature of this embodiment could include the use of voice identification software that recognizes the user's voice in order to grant access to the user profile. This combines the higher security of voice recognition with a password in order to create an added layer of security to protect access to private information.

A further embodiment of the system 200 implements natural language recognition software. This involves users speaking naturally into the system 200 and the system converting this language into a digital signal. The digital signal is then communicated in association with the user profile where key words are picked up and converted into device specific text or control commands. This device specific text is then used to operate the device.

Figure 8:
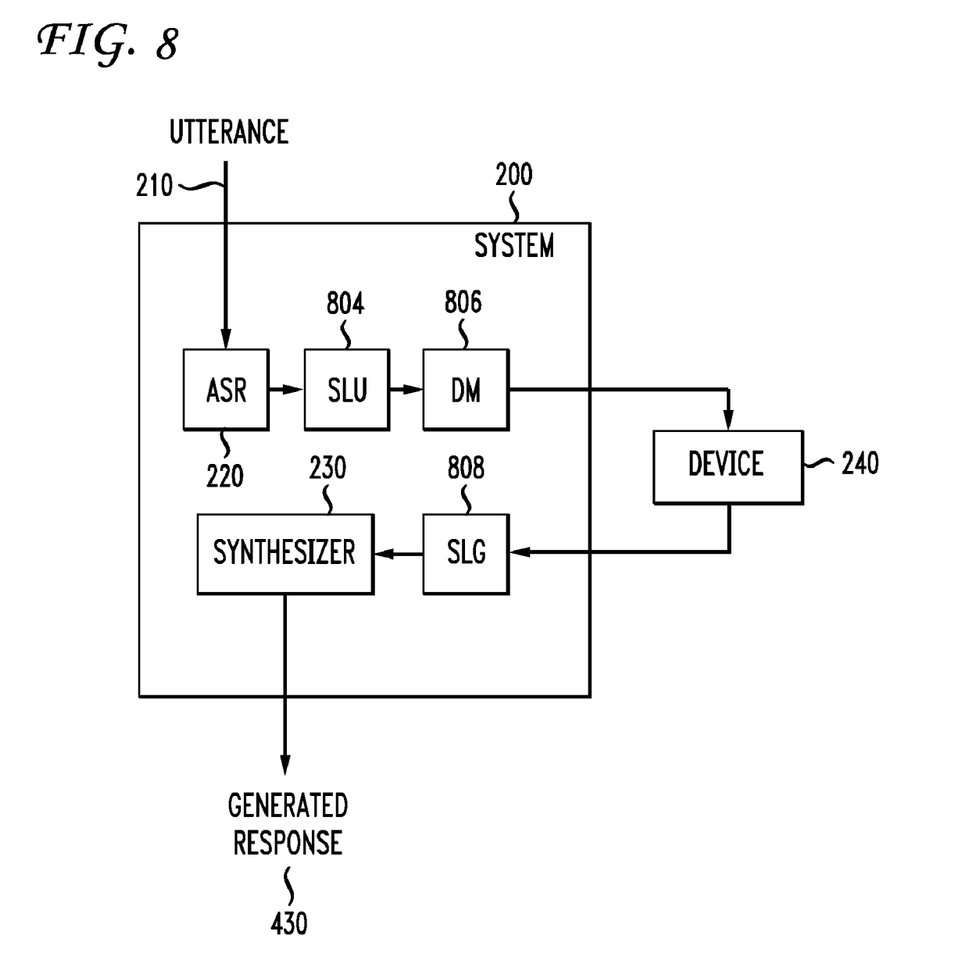
FIG. 8 illustrates an example system being able to accept natural language.

FIG. 8 is a functional block diagram of system 200 allowing the system to accept the utterance 210 as spoken natural language from the user. The system 200 can include an automatic speech recognition (ASR) module 220, a spoken language understanding (SLU) module 804, a dialog management (DM) module 806, a spoken language generation (SLG) module 808, and synthesizer module 230. The synthesizer module 230 may be any type of speech output module. For example, it may be a module wherein one of a plurality of prerecorded speech segments is selected and played to a user as in known text-to-speech systems. Thus, the synthesizer module 230 represents any type of speech output.

This natural language system supplements the already existing modules. ASR module 220 may analyze speech input and may provide a transcription of the speech input as output. SLU module 804 may receive the transcribed input and may use a natural language understanding model to analyze the group of words that are included in the transcribed input to derive a meaning from the input. The role of DM module 806 is to interact in a natural way and help the user to achieve the task that the system is designed to support. DM module 806 may receive the meaning of the speech input from SLU module 804 and may determine an action, such as, for example, controlling the device 240, based on the input. SLG module 808 may generate a transcription of one or more words in response to the output of the device 240 in response to the command provided by DM 806. Synthesizer module 230 may receive the transcription as input and may provide generated audible speech as output based on the transcribed speech.

These various modules may also communicate data one to another as necessary to carry out the functions demonstrated herein.

Thus, when the system 200 contains the natural language modules, the system 200 may recognize speech input, such as speech utterances, may transcribe the speech input, may identify (or understand) the meaning of the transcribed speech, may determine an appropriate command based on the speech input, may generate text of the appropriate response and from that text, may generate audible "speech" from system 200, which the user then hears. In this manner, the user can carry on a natural language dialog with system 200. Those of ordinary skill in the art will understand the programming languages and means for generating and training ASR module 220 or any of the other modules in the system 200. Further, the modules of system 200 may operate independent of a full dialog system. For example, a computing device may have an ASR module 220 wherein a user may say "turn off at 8:00 p.m. tonight" and the computing device may act on the instruction without a "spoken dialog."

It is also readily understood that the system 200 may contain both a user profile 230 and the modules associated with natural language understanding, namely the ASR, SLU, DM, SLG, and synthesizer modules. Therefore, the system may use the user profile and identifiers to control access to different devices while also being able to accept the user utterances in natural language format.

Figure 9:
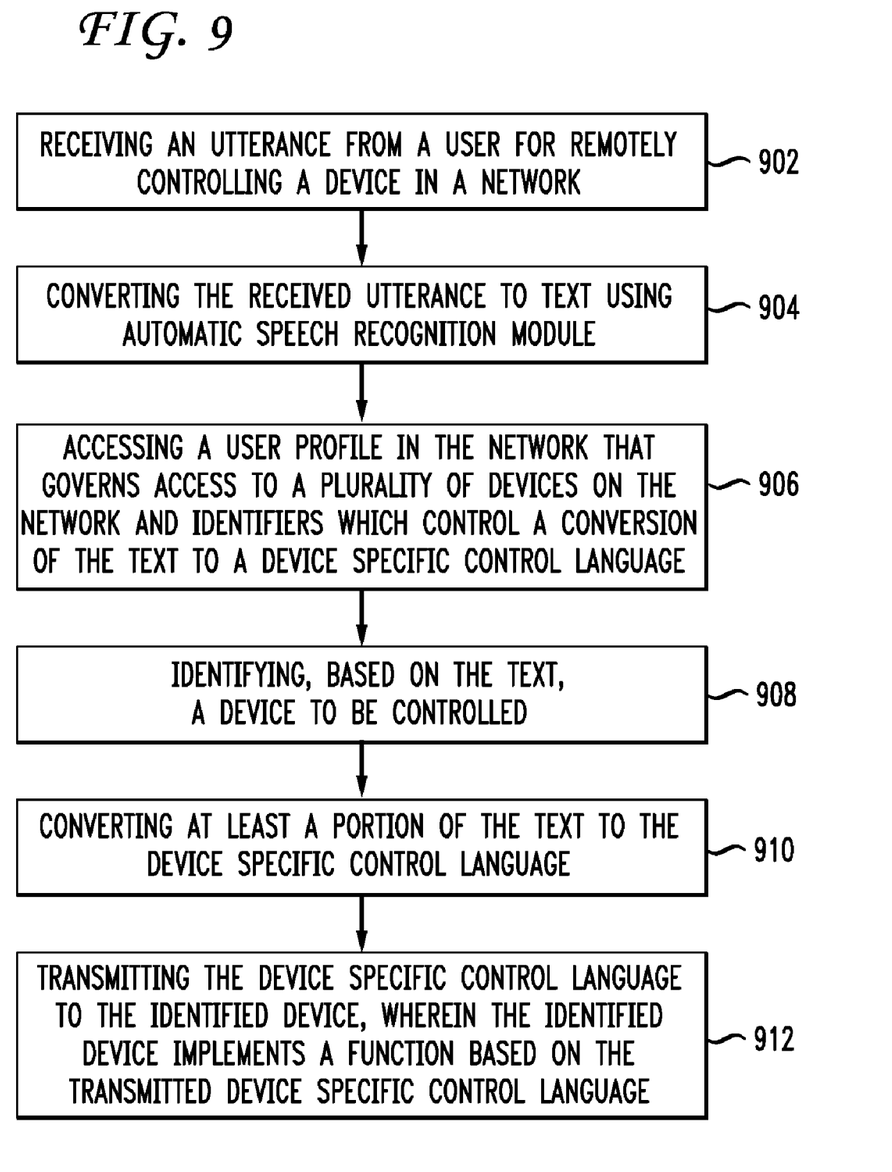
FIG. 9 illustrates a method embodiment of the invention.

Another embodiment of the invention relates to method for controlling devices connected to a network. Using the principles above, the method embodiment includes receiving an utterance from a user for remotely controlling a device in a network (902), converting the received utterance to text using automatic speech recognition module (904), accessing a user profile in the network that governs access to a plurality of devices on the network and identifiers which control a conversion of the text to a device specific control language (906), identifying, based on the text, a device to be controlled (908), converting at least a portion of the text to the device specific control language (910) and transmitting the device specific control language to the identified device, wherein the identified device implements a function based on the transmitted device specific control language (912).

It is preferable in the method that the received utterance be in a natural language format. Those of skill in the art will understand how to generally implement a spoken dialog system in which a user can interact with a system using natural language. However, the additional functionality disclosed herein enables the information received from a natural language interaction to be used to control specific devices on a network.

Other aspects of the method embodiment include receiving a response from the identified device, accessing the user profile wherein the identifiers convert at least a portion of the response from the identified device into conversational text and then generating an automatic response, via text-to-speech or some other mechanism, from the conversational text. The system may also create a first user profile which includes at least one access parameter as well as creating at least a second user profile which must meet the at least one access parameter in order to gain access to the identifiers that are used to control devices on the system. The method may also further include receiving a request for access from a user associated with the at least one second user profile, converting the request for access to an evaluation text using the automatic speech recognition module and evaluating the evaluation text for meeting the at least one access parameter, wherein an evaluation result is generated that contains an allowance or denial of access to the device. Yet another aspect of the embodiment includes converting the evaluation text to an evaluation request text using the identifiers, generating an evaluation request from the evaluation request text, communicating the evaluation request to a user associated with the at least first user profile, receiving an evaluation answer from the user associated with the at least first user profile, determining whether the evaluation answer is an allowance or denial and, if the evaluation answer is an allowance, granting access to the identifiers, if the evaluation answer is a denial, denying access to the identifiers. The various functions described herein may be performed according to the system disclosed and particular modules which are configured to carry out individual functional steps.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the security devices can be applied to individual user profiles prior to accepting any spoken communication. Accordingly, the appended claims and their legal equivalents should only define the invention, rather than any specific examples given.

What is claimed is:

1. A method comprising:
   converting, via a processor, an utterance from a user for controlling a remote device in a network to a device specific control language associated with the remote device to yield a remote device communication;
   synthesizing a response from the remote device that is based at least in part on the remote device communication to yield an audible response; and
   communicating the audible response to the user.

2. The method of claim 1, further comprising:
   accessing a user profile having an access parameter associated with the remote device.

3. The method of claim 2, further comprising:
   receiving a request for access to the remote device from a second user associated with a second user profile;
   converting the request for access into text;
   determining if the text sufficiently matches a criteria associated with the access parameter to yield an access decision;
   generating an access result comprising one of allowing the second user access to the remote device and denying the second user access to the remote device; and
   communicating the access result to the second user.

4. The method of claim 3, wherein the criteria is associated with a date on which the request is received.

5. The method of claim 3, wherein the user and the second user are in a hierarchy, where the user can set access rights for the second user.

6. The method of claim 1, wherein the utterance is in a natural language format.

7. The method of claim 1, wherein the remote device is at least one of a television, a cable box, a home alarm, a kitchen appliance, and HVAC equipment.

8. A system comprising:
   a processor; and
   a computer-readable medium having stored therein instructions which, when executed by the processor, cause the processor to perform a method comprising:
      converting an utterance from a user for controlling a remote device in a network to a device specific control language associated with the remote device to yield a remote device communication;
      synthesizing a response from the remote device that is based at least in part on the remote device communication to yield an audible response; and
      communicating the audible response to the user.

9. The system of claim 8, the computer-readable medium storing instructions which, when executed by the processor, cause the processor to perform a method further comprising:
   accessing a user profile having an access parameter associated with the remote device.

10. The system of claim 9, the computer-readable medium storing instructions which, when executed by the processor, cause the processor to perform a method further comprising:
    receiving a request for access to the remote device from a second user associated with a second user profile;
    converting the request for access into text;
    determining if the text sufficiently matches a criteria associated with the access parameter to yield an access decision;
    generating an access result comprising one of allowing the second user access to the remote device and denying the second user access to the remote device; and
    communicating the access result to the second user.

11. The system of claim 10, wherein the criteria is associated with a date on which the request is received.

12. The system of claim 10, wherein the user and the second user are in a hierarchy, where the user can set access rights for the second user.

13. The system of claim 8, wherein the utterance is in a natural language format.

14. The system of claim 8, wherein the remote device is at least one of a television, a cable box, a home alarm, a kitchen appliance, and HVAC equipment.

15. A non-transitory computer-readable storage medium having stored therein instructions which, when executed by a computing device, cause the computing device to perform a method comprising:
    converting an utterance from a user for controlling a remote device in a network to a device specific control language associated with the remote device to yield a remote device communication;
    synthesizing a response from the remote device that is based at least in part on the remote device communication to yield an audible response; and
    communicating the audible response to the user.

16. The non-transitory computer-readable medium of claim 15, the instructions which, when executed by the computing device, cause the computing device to perform a method further comprising:
    accessing a user profile having an access parameter associated with the remote device.

17. The non-transitory computer-readable medium of claim 16, the instructions which, when executed by the computing device, cause the computing device to perform a method further comprising:
    receiving a request for access to the remote device from a second user associated with a second user profile;
    converting the request for access into text;
    determining if the text sufficiently matches a criteria associated with the access parameter to yield an access decision;
    generating an access result comprising one of allowing the second user access to the remote device and denying the second user access to the remote device; and
    communicating the access result to the second user.

18. The non-transitory computer-readable medium of claim 17, wherein the criteria is associated with a date on which the request is received.

19. The non-transitory computer-readable medium of claim 17, wherein the user and the second user are in a hierarchy, where the user can set access rights for the second user.

20. The non-transitory computer-readable medium of claim 17, wherein the utterance is in a natural language format.

* * * * *